C. ZERK.
LUBRICATING DEVICE.
APPLICATION FILED JULY 31, 1913.

1,180,361.   Patented Apr. 25, 1916.

WITNESSES:
P. L. Bruck.
Justin W. Macklin

INVENTOR.
Oscar Zerk
By Albert N. Bates,
Attorney.

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

LUBRICATING DEVICE.

1,180,361.     Specification of Letters Patent.     Patented Apr. 25, 1916.

Application filed July 31, 1913. Serial No. 782,179.

*To all whom it may concern:*

Be it known that I, OSCAR ZERK, a subject of the Emperor of Austria, residing at Cleveland, in the county of Cuyahoga and State of Ohio, have invented a certain new and useful Improvement in Lubricating Devices, of which the following is a full, clear, and exact description, reference being had to the accompanying drawings.

This invention relates to grease cups, lubricating bolts and similar devices, wherein there is a body, a cap, and a lock for preventing the inadvertent removal of the cap from the body.

The invention is concerned particularly with the means for holding the spring lock, whereby it may be easily put in place and a new spring easily substituted in case of breakage.

The invention is hereinafter more fully explained and the essential characteristics are summarized in the claims.

Figure 1:
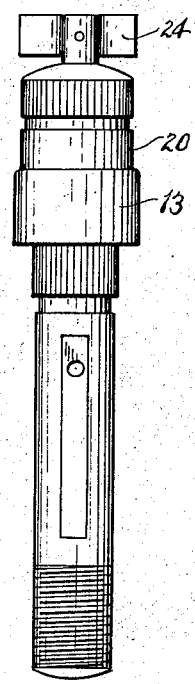
Figure 2:
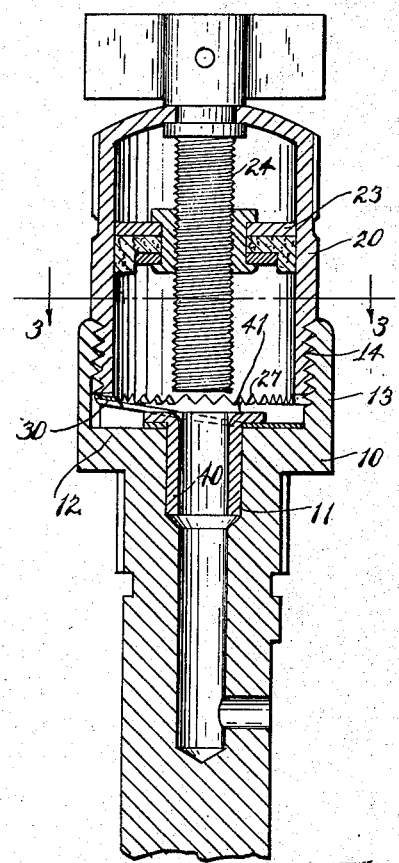
Figure 3:
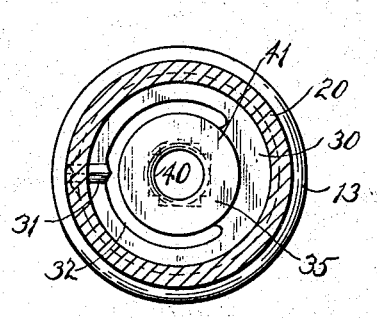
Figure 4:
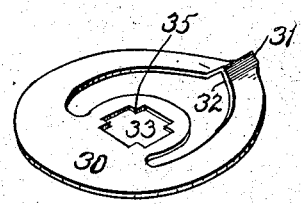

In the drawing, Figure 1 is a side elevation of a spring bolt embodying my invention; Fig. 2 is a longitudinal central section thereof; Fig. 3 is a cross section substantially on the line 3—3 of Fig. 2, omitting the feeding screw; Fig. 4 is a perspective view of the locking spring.

Referring to the parts shown by numerals, 10 indicates the base portion, which may be a bolt or the body of a grease cup, or similar article. This base portion is shown as having a bore 11, a bottom part 12, and an upright wall 13, which is internally threaded at 14.

20 indicates the cap screwing into the wall 13 by means of external threads 21 on the cap.

23 is a plunger within the cap, and 24 a wing screw journaled in the top of the cap and threaded into the plunger, whereby the plunger may be caused to travel in the cap to feed the grease.

To lock the cap to the base, I provide a spring 30 within the base, and secured to it and having a projection 31 adapted to coact with notches 27 on the lower edge of the cap. The spring is in the form of a washer having a cut out portion 32 to enable the rib parts 31 to spring freely. Through the central portion of the washer is an opening 33 adapted to receive a member to secure it to the base. The member which secures the spring is a separate thimble 40, which is forced into an enlarged portion of the bore 11, and has a flange 41 overhanging the central portion of the washer. The opening of the washer 33 is preferably angular, shown at 35, having inwardly projecting points, so that, when the thimble 40 is flanged downwardly onto the washer, the same is not only locked effectively to the base against up and down movement, but against any rotative movement, by means of these points 35 slightly engaging it.

By securing the spring to the base by means of the separate thimbles 40 with the upper end outwardly bent and forced onto the spring, I not only provide a very effective securing of the spring to the base, but I also provide easy means for replacing the spring in case of breakage. In such case, it is only necessary to bore out or otherwise remove the thimble, which is preferably of comparatively soft metal, and then put a new thimble through a new spring. As the springs are necessarily the parts of the cup which give out most often, it will be seen that, by making the thimble separate, enabling the replacement of broken springs, I have greatly increased the effective life of the lubricating device.

Having thus described my invention, what I claim is:

1. In a lubricating device, the combination of a base and a cap screw threaded together, of a locking part carried by the base and coacting with the lower edge of the cap, and means for attaching the locking part to the base, said means extending into the bore of the base, substantially as and for the purpose set forth.

2. A lubricating device, the combination of a base and the cap screw fitted together, of a locking part carried by the base and coacting directly with the annular wall of the cap, said part overlying the upper face of the base, and means for attaching the locking part to the base, said means extending into the bore of the base, substantially as and for the purpose described.

3. In a lubricating device, the combination, with a base portion and a cap portion screw threaded together, of a spring carried by one of said members and coacting with notches in the other, and a thimble passing through said opening into the bore of the ing it to its member.

4. In a lubricating device of the character described, the combination of a base portion having a bore, a cap screw threaded to the base, a washer-like spring designed to coact with the edge of the cap and having an opening, and a thimble extending through said opening into the bore of the base for holding the spring thereto.

5. In a lubricating device of the character described, the combination of a base having a bore, a cap screw-threaded to the base and having a notched edge, a spring having a projection designed to coact with said edge and having an opening, and a flanged member extending through the opening of the spring and occupying the bore of the base for locking the spring thereto.

6. The combination of a base having a bore, a washer-like spring having an opening adapted to aline with the bore, a flanged thimble occupying the bore and extending over the spring, the opening of the spring occupied by the thimble being roughened or serrated, and a cap coacting with the spring and base.

In testimony whereof, I hereunto affix my signature in the presence of two witnesses.

OSCAR ZERK.

Witnesses:
BRENNAN B. WEST,
ALBERT H. BATES.